UNITED STATES PATENT OFFICE.

AUGUSTE J. ROSSI, OF NEW YORK, N. Y., ASSIGNOR, BY MESNE ASSIGNMENTS, TO THE TITANIUM ALLOY MANUFACTURING COMPANY, A CORPORATION OF MAINE.

PROCESS OF PRODUCING ALLOYS OR COMPOUNDS OF COPPER AND TITANIUM.

No. 12,764. Specification of Reissued Letters Patent. Reissued Mar. 17, 1908.

Original No. 700,244, dated May 20, 1902, Serial No. 39,331. Application for reissue filed January 31, 1908. Serial No. 414,000.

*To all whom it may concern:*

Be it known that I, AUGUSTE J. ROSSI, a citizen of the United States, residing in the borough of Manhattan, city, county, and State of New York, have invented a new and useful article of manufacture, being a compound or alloy of copper and titanium, and a new and useful process for the production thereof and of kindred alloys derived from metals in the metallic state combined with metals previously in an oxygenated state, of which the following is a specification.

The object of my invention is to produce not only the aforesaid compound or alloy of copper and titanium, but also a simple, readily-carried-out, and industrially-economical process for producing the same, as well as other kindred alloys into which are combined a desired metal normally available in its metallic state with another metal or metals existing in the form of oxids.

My invention consists, among other things, in utilizing in the production of said alloys a bath consisting of molten aluminium and another molten metal or metals introduced into the charge in the metallic state, then introducing into the bath the oxygenated metal or metals and applying to the molten mixture while supported such heat as to cause the separation of the oxygen from the said oxygenated metal and its combination with the aluminium, whereby the ingredients of the charge become separated into two general divisions, the one consisting of the molten metal, which was introduced in its metallic state, other than the aluminium, and combined or alloyed with the metal which was introduced in its oxygenated state, and the other consisting of a slag composed of the combined oxygen and aluminium in the form of alumina, and also other impurities present in the charge, which slag is readily separable from the said alloy.

Letters Patent of the United States No. 648,439 were granted to me on the 1st day of May 1900, for a process for producing alloys of iron and titanium which process consisted, broadly, in introducing titanic acid into a bath of molten iron and aluminium and supplying to the mixture while supported heat sufficient to institute the requisite reaction between the aluminium and the oxygen of the acid, and I then believed that the molten iron as such played an important if not indispensable part in facilitating and promoting the said reaction; but I have since discovered that molten or any iron is not essential or indispensable in the charge, but that other molten metals—as, for instance, molten copper—may be substituted therefor without impairing the reduction of the titanic acid by the aluminium, and that thus, due regard being had to the application and maintenance of the required heat, an alloy of titanium and copper or of such other metals may be readily and economically produced on an industrial scale for use in manufacture and the arts.

My present invention, like that covered by my previous Letters Patent, depends in a measure upon the fact that the heat of a given metal's combination with oxygen varies at different temperatures, diminishing generally as the latter rise, and that while the heats of such combination of formation in the case of two given metals may be identical at a certain very high temperature such heats vary absolutely, and particularly relatively to each other as the temperatures vary, so that at lower temperatures said heat of oxid formation of the one metal used in my process as the reducing agent may be enormously greater than the corresponding heat at the same temperature of another similarly-used metal or substance—as, for instance, assuming that the temperatures of oxid formation of carbon and aluminium per one atomic weight of oxygen are substantially identical at the temperature of 2,000° centigrade or thereabout, at the reduced temperature of, say, 0° centigrade to 500° centigrade the heat of formation of alumina is substantially one hundred and thirty thousand calories and that of carbon only twenty-eight thousand calories, while at temperatures above 2,000° centigrade the heat of formation of carbon monoxid becomes greater than that of alumina and carbon begins to decompose alumina. From this it follows that certain metals may be employed with great advantage under conditions hereinafter described as reducing agents for such a refractory oxid as that of titanium, for instance, and my experiments and tests have demonstrated such to be the fact.

I am aware that aluminium is a very powerful reducing agent and has long been known as such, and that it has been prior to my said invention used to a limited extent for the reduction of metallic oxids; but according to my information the aluminium and oxids involved have in such cases been preliminarily reduced to a state of impalpable powder and intimately mixed or subjected to the action of additional reagents—as, for instance, fluorids of the alkaline metals and aluminium. In this manner under ordinary temperature one point of the mixture has been raised to a temperature sufficiently high to commence the desired reaction, whereupon the latter is then continued exothermally until complete—that is, without the assistance of any external heat; but the expense of the aforesaid previous preparation of the aluminium has proved prohibitory of industrial utilization of such reaction at least in many fields, among them conspicuously those in which it has been desired to produce alloys of titanium with other metals, and, moreover, the comparatively brief duration of the great heat produced by the said reaction and the combination of the oxygen of the metallic oxid with the reducing metal has proved inadequate to secure such reaction completely in all ingredients of the charge subject thereto, the comprehensiveness of the extent of reaction secured in such cases being dependent upon and proportional to the intimateness with which the powdered particles of the reducing metal are mechanically approximated to and commingled with the corresponding powdered particles of the oxygenated metal. I am not aware that it has ever prior to my present invention been even attempted to produce alloys even of iron and titanium by the use of such processes involving the preliminary reduction of the reducing and refractory oxygenated metal into conditions of fine powder to insure mechanical mixture and dependent thereafter upon the exothermal heat developed by the reaction; but I am satisfied from experiments made by me that aside from the expense involved in such preliminary preparation of the materials—an expense prohibiting the application of such processes on an industrial scale—such processes are incapable of producing either with certainty or with any requisite uniformity that completeness of reaction through all parts of the charge requisite to insure the production of an alloy of the metal sought to be combined with the normally oxygenated metal, free from uncombined remnants of the reducing metal as well as other undesirable impurities.

The process of producing the alloys involved in my present invention is as follows: I provide in any convenient way for the support of the oxygenated metal and the metal to be alloyed therewith a bath consisting in whole or in part of a liquefied metal, (preferably aluminium), the heat of the formation of the oxid of which is at a certain high temperature, presumably greater than that of the formation of the oxid of the said oxygenated metal—that is to say, in a crucible or other convenient supporting vessel I prepare a bath of molten aluminium by utilizing for that purpose in any convenient manner temperatures sufficient to reduce the aluminium to and retain it in molten state. I then further introduce into the crucible and into such molten aluminium such proportion of one of the metals to be alloyed as will be required to form an alloy of the composition desired. This metal being in the metallic state I likewise melt it down in the crucible, so that it shall become a component of the bath. I next introduce into the bath such proportion of the oxygenated metal—as, for instance, rutile—as will insure in the resulting alloy the desired proportion of such metal—as, for instance, titanium—and it will be observed that the ingredients thus entering into the bath are introduced therein not necessarily in a powdered condition, but merely in their natural condition of such coarse subdivision as will tend to accelerate their reduction to the molten state. I next raise the temperature of the bath so constituted to a point sufficiently high to insure the commencement of the reaction in which the refractory oxygenated metal parts with its oxygen and the latter combines with the aluminium to form alumina. The intense heat resulting from the said reaction supplements uninjuriously the temperature already previously secured, and in fact this exothermal excess of heat would during its continuance permit of the reduction of the temperature first applied to the charge as aforesaid were such reduction of any economical importance; but it will be observed that as the exothermal heat of the reaction diminishes I take pains to supply from the original external source such continuance or addition of heat as to maintain the ingredients of the charge at the temperature requisite to insure fluidity, and the full accomplishment of the aforesaid reaction among such particles of the charge as may have failed to become requisitely associated during the comparatively brief duration of the exothermal heat arising from the said reaction taking place in the major portion of charge.

The result of my aforesaid improved process and treatment of the ingredients of the charge is as follows: As the oxygenated compound becomes reduced its molten metallic constituents become associated with the molten metal with which it is sought to make the alloy, while the liberated oxygen is simultaneously taken up by the aluminium, producing an alumina slag which either floats upon the surface of the bath and can be thus separated and withdrawn by any of those numerous methods which will be obvious to those skilled in the art or readily separated after cooling the charge. Other impurities in the charge, whether derived from the materials of the vessel in which the operation is carried on or from the gangues of the oxygenated metal or the metal to be alloyed therewith, or both, will on the sufficient continuance of the high temperature required enter into and become constituents of the said slag, into which, on the one hand, will become incorporated substantially all impurities of the charge, leaving, on the other hand, in the nether portions of the bath a substantially pure metallic alloy of the desired metals. As regards temperature, the requirements are the application of an external initial heat sufficiently high not only to liquefy the metallic constituents of the charge, but also to set up the aforesaid reaction. While the exothermic action is occurring, and consequently high temperatures generated thereby, the amount of external heat may, if desired, be diminished; but upon the termination of the exothermic action the heat derived from an external source should be again raised to such a temperature as to insure the continued fluidity of the charge, and thus the extension of the reaction to all particles capable of participating therein. Such being the requirements of temperature in the use of my process, I find it preferable to derive the required heat through the instrumentality of an electric furnace or other application of high electrically-derived temperatures, since such means of heating are more readily controlled during the various stages of my process than any other with which I am acquainted. A convenient manner of utilizing in the application of my process such electrically-derived heat consists in supporting the ingredients of the charge in a crucible contained in a furnace and surrounded by carbon, into which are projected the electrodes, such an apparatus being illustrated in the drawings of Letters Patent of the United States previously granted to me No. 609,466, on August 23, 1898; but it will be understood that any other means of producing in the charge, electrically or otherwise the required high temperatures will be sufficient. The amount of heat required is merely such as to insure the liquefaction of the metallic constituents of the charge and the raising of the bath of aluminium to and its maintenance at a sufficiently high temperature to reach the point of the heat of formation of alumina as a maximum, which is supposed to be in the vicinity of 2,000° centigrade, or thereabout.

The relative proportion of the ingredients of the charge cannot be stated by any hard and fast rule, but would depend in each instance upon the varying qualities of the ingredients, as well as the respective percentages of the combined metals desired in the alloy. The intensity of the external heat to be supplied during the operation of my process will depend in all cases on the more or less refractory character of the alloy intended to be obtained, and experiment and practice alone can teach in each case which form of heat is the most convenient or best adapted therefor. As a general rule it may be stated that the oxygenated metal or metals should be supplied in such proportion relative to the aluminium of the bath as to insure the complete combination on the reaction of all aluminium and oxygen in the charge. Experiment will be required in each case of varying materials to determine in advance this proportion; but one of the advantages of my process consists in the facility with which any residuum of aluminium remaining in the charge after the completion of there action may be refined out of the alloy merely by the addition of further metallic oxids while the temperature and molten condition of the charge is maintained.

My preference for performing my process by the aid of heat derived from an electrical source is not to be taken as excluding other heating means. In many cases I find that for certain ferro metals the high temperatures of an electric furnace are not required, but that those of an open-hearth furnace or any other similar metallurgical contrivance by means of which sufficiently high temperatures can be produced will prove sufficient, the only limitation being that the source of heat shall be of such a character and capacity as to maintain the alloy in a molten condition after the reduction of the oxids by the aluminium and long enough to insure the separation of ingredients of the charge above described and the resulting purification of the alloy. In all cases of the application of my said process and whatever may be the metallic oxid reduced the aluminium oxidized into alumina at the expense of the oxygen of such oxids forms, as I have stated, a slag which is readily separated from the alloyed metals underneath it when cooled or which can be tapped out of the furnace, if desired. This melted alumina as a sort of artificial corundum forms an excellent abrasive material somewhat akin to natural corundum, which is impure alumina, and this by-product of the alloy is valuable for use as such abrasive material, or it may be treated as bauxite is in order to remove such impurities as may be associated with it as resultant slag from my process, impurities derived from the gangues of the metallic oxids used, and thus practically pure alumina produced ready to be reduced to aluminium again by well-understood processes. I have in this manner recovered from the use of the aluminium bath in my process eighty to ninety per cent. of the aluminium used as a reducer, which appreciably increases the economy of my said process. My experiments have also demonstrated that my process is particularly applicable, as stated, to the introduction of metals other than iron into combination or alloy with titanium. For instance, I have been enabled in this way to produce the hitherto to me unknown alloy of copper and titanium, which alloy I have named "cupro-titanium." In such cases I have substituted for the bath of iron, specified as essential in my aforesaid Letters Patent for the production of ferro-titanium, a bath of molten copper and have charged into the furnace containing the same (preferably, though not necessarily, an electric furnace for the reasons given above) aluminium in ingots in quantity sufficient to accomplish the requisite reaction and have added to the charge in the requisite proportions, as above stated, to insure a complete reaction titanic acid in moderately-coarse grains, and initiating and maintaining in the charge a temperature sufficient to insure, first, liquefaction of the metallic constituents, next, the inception of the reaction between the aluminium and the oxygen of the oxid, and, finally, the continued maintenance of the charge in a molten condition until the requisite separation between the constituents has been secured have thus obtained the said new alloy of copper and titanium. I have thus obtained such alloy containing in different instances, according to requirement and constitution of the charges, copper and, respectively, 5.55 per cent., 8.45 per cent., and 14.15 per cent. of titanium and possessing such properties of toughness as not to bend even under a heavy sledge-hammer blow, and some of which alloys have proved even at their surface sufficiently hard to scratch glass. As an illustration of practically successful working charges for thus producing cupro-titanium I may mention the following: Copper, one hundred pounds; rutile, nine pounds; aluminium, five pounds. Copper, one hundred pounds; rutile sixteen pounds, aluminium, eight pounds. Copper, one hundred pounds, rutile, thirty pounds; aluminium, fifteen pounds. In the case of the first two mixtures thus constituted I was able to operate successfully the application of the process in a wind-furnace with a strong blast, the resulting cupro-titanium alloy containing, respectively, five per cent. and eight per cent. of titanium and being sufficiently fluid even under the heat thus employed to be poured off in waffles. In the case of the last mixture above mentioned I used with equal success the heat of an electric furnace. Should it be desired to introduce nickel, molybdenum, chromium, vanadium, or any other metal into alloy with the copper, the oxids of such other metals should be substituted for the titanic oxid, taking care that the said oxids so substituted shall be as free from impurities as ava lable or even in some cases specially purified for the purposes of the process. In the case that molybdenum is used for instance molybdic acid, in the case of vanadium, vanadic acid, &c., might be used.

What I claim as new, and desire to secure by Letters Patent, is the following, viz:

1. The process of producing alloys of metals assembled in the metallic state with metals in oxygenated state which consists in providing a bath of molten reducing metal the heat of the formation of whose oxid is at a given temperature greater than that of the said oxygenated metal; introducing into said bath the said metals assembled in the metallic state and reducing them likewise to a molten condition; introducing into said bath the said metals in oxygenated state, and developing in the charge a temperature sufficiently high to insure the requisite reaction between said reducing metal and the oxygen of the oxygenated metals leaving the liquefied metallic residuum of the latter to become alloyed with the liquefied metals which were introduced in the metallic state, substantially as and for the purposes described.

2. The process of producing alloys of metals assembled in the metallic state with metals in oxygenated state, which consists in introducing into a bath of aluminium and of such metals in the metallic state molten together the oxygenated metal and then developing in the charge a temperature sufficiently high to insure the requisite reaction between the said molten aluminium and the oxygen of said metals in the oxygenated state leaving the metallic residuum of said last mentioned metals to become alloyed with the said liquefied metal which was introduced in its metallic state into the charge other than aluminium, while the latter combines with the oxygen of said oxygenated metals and as an alumina slag containing also other impurities of the charge is separated from the metallic alloy aforesaid, substantially as and for the purposes described.

3. The process of producing an alloy or compound of copper and titanium which consists in introducing, into a bath of aluminium and copper molten together, titanic acid and then developing in the charge a temperature sufficiently high to insure the requisite reaction between the said molten aluminium and the oxygen of the titanic acid leaving the molten titanium to become alloyed with the molten copper while the aluminium combines with the oxygen of the said titanic acid and as an alumina slag containing also other impurities of the charge is separated from the said alloy of copper and titanium, substantially as and for the purposes described.

4. As a new article of manufacture a compound or alloy containing an important quantity of copper say not less than 10 per centum of the mass and titanium in industrially important proportions that is to say not less than 5 per centum of the mass, substantially as and for the purposes described.

5. As a new article of manufacture an alloy or compound of copper and titanium, substantially as and for the purposes described.

AUGUSTE J. ROSSI.

Witnesses:
ED. AD. BRUCKNER,
J. GERBER.